United States Patent [19]

Gerber

[11] 4,280,281

[45] Jul. 28, 1981

[54] REMOTELY ADJUSTABLE SIGHTING DEVICE FOR TRACTORS

[76] Inventor: B. Lynn Gerber, 6286 E. Catalina Dr., Scottsdale, Ariz. 85251

[21] Appl. No.: 99,526

[22] Filed: Dec. 3, 1979

[51] Int. Cl.³ .............................................. G01C 15/00
[52] U.S. Cl. .................................... 33/264; 33/185 V
[58] Field of Search ..................... 33/185 V, 264, 161, 33/296, 293, 338, 286

[56] References Cited

U.S. PATENT DOCUMENTS

| 2,827,704 | 3/1958 | Hunsicker | 33/185 V X |
| 3,654,653 | 4/1972 | Eggert, Jr. et al. | 33/264 X |
| 3,943,635 | 3/1976 | Ito | 33/264 |

Primary Examiner—William D. Martin, Jr.
Attorney, Agent, or Firm—Cahill, Sutton and Thomas

[57] ABSTRACT

A sighting device for attachment to the hood of the tractor is remotely adjustable by a driver seated in a driver's seat of the tractor to enable him to visually align the tractor with a swath or furrow previously cut in a field by a towed farm implement so that a swath or furrow presently being cut by the farm implement is properly aligned with the previously cut swath or furrow. The sighting device includes a pair of opposed horizontal telescopic extension arms and a pair of pivot arms pivotally attached to respective outer ends of the extension arms. Each of the pivot arms is utilized as a sighting blade which is oriented so that, as seen by the eyes of the driver, the sighting blade is parallel to and aligned along the previously plowed furrow or the edge of the previously cut swath. The degree of extension of the horizontal extension arms and the degree of inclination of the pivot arms are independently controllable by means of a pair of momentary switches located near the driver's seat.

12 Claims, 12 Drawing Figures

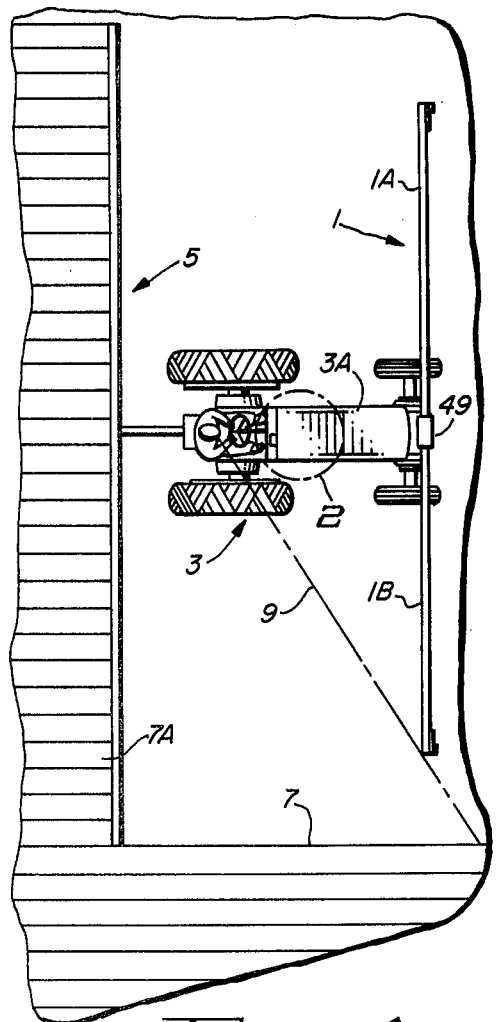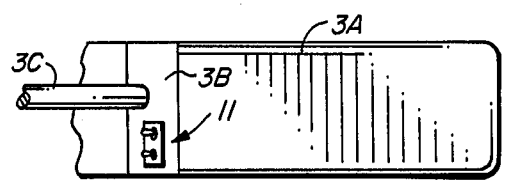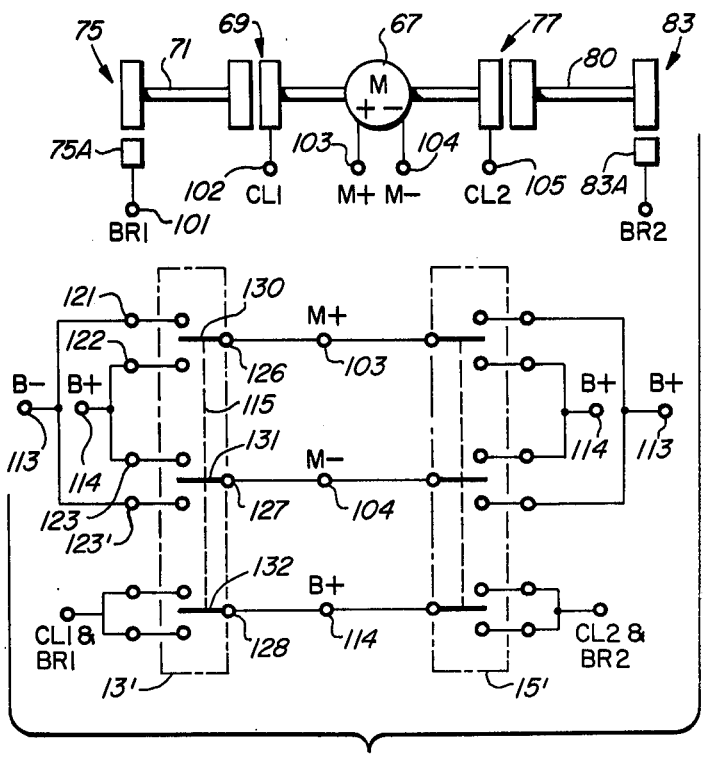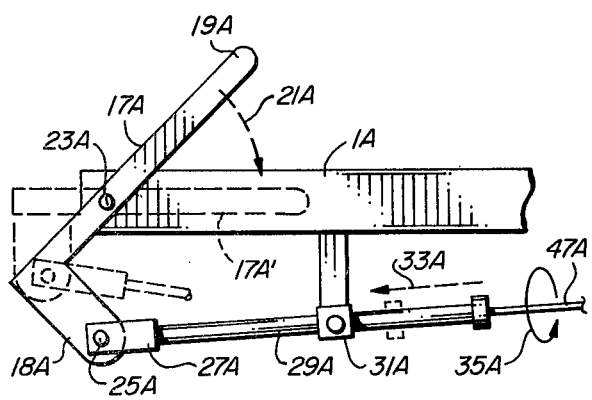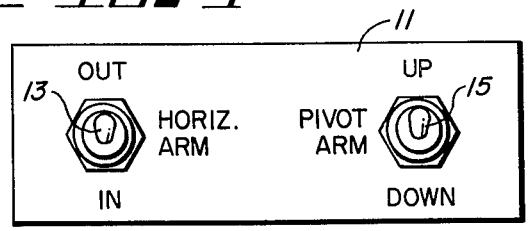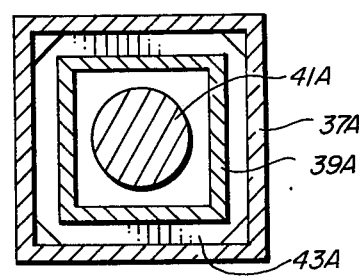

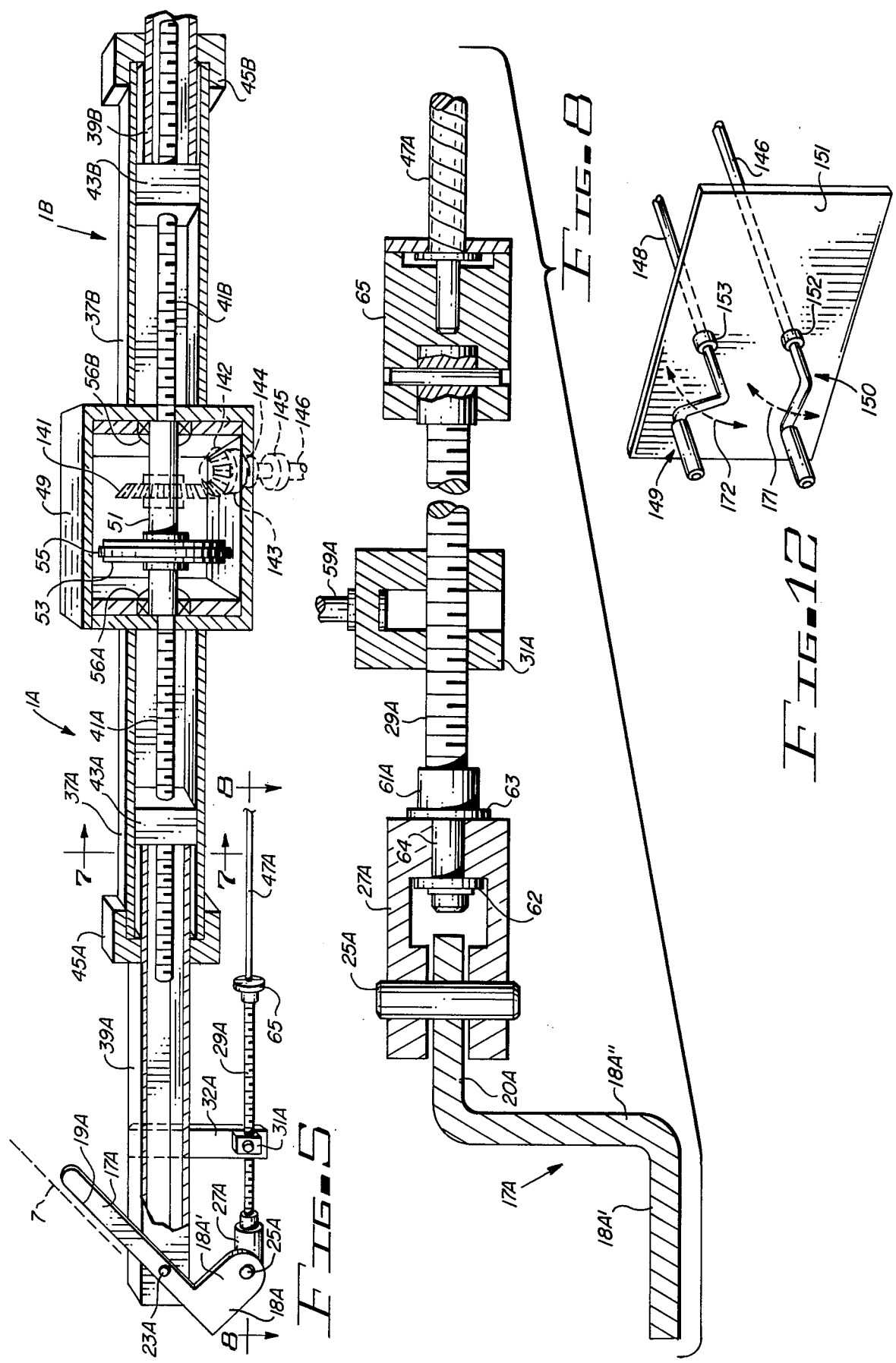

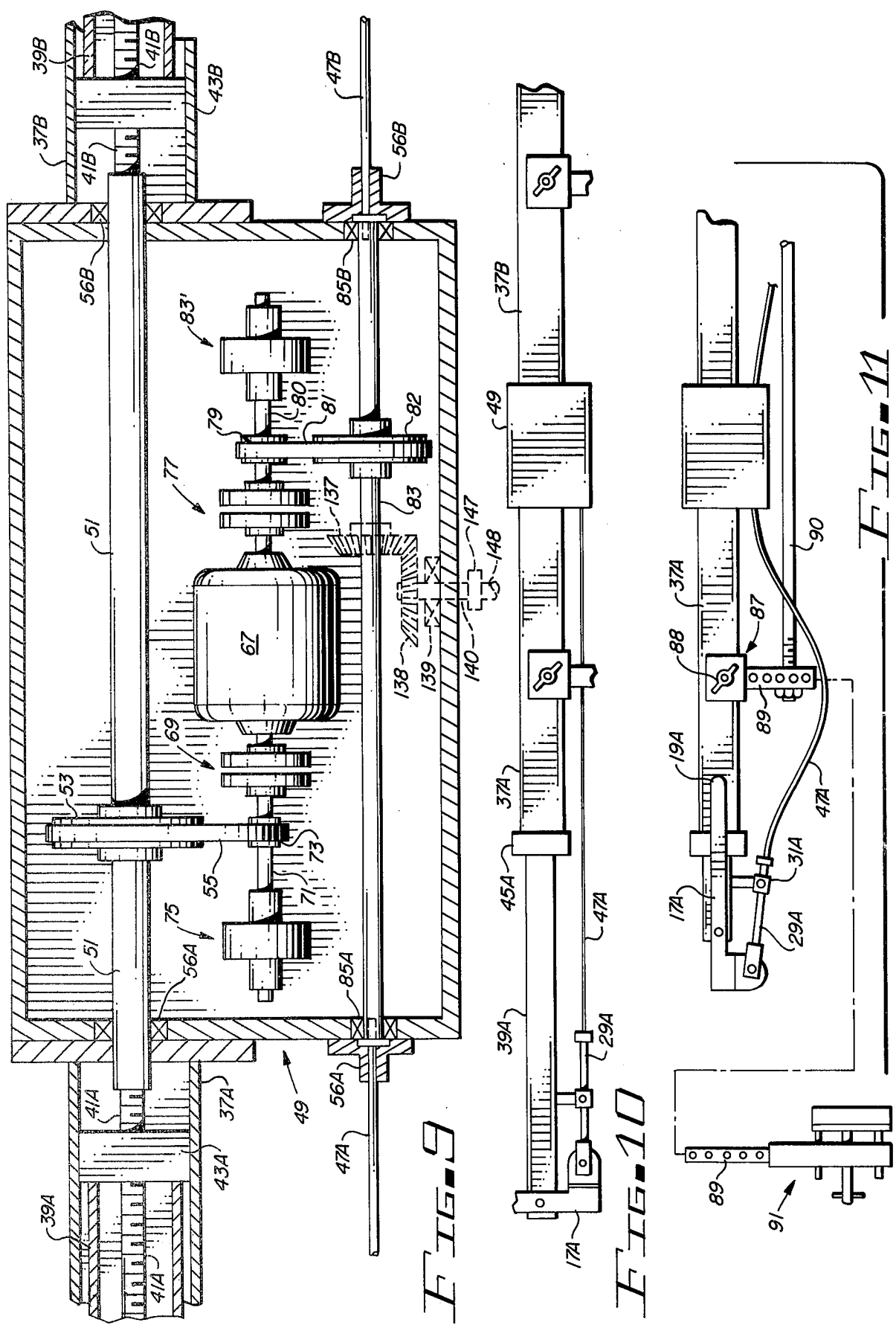

REMOTELY ADJUSTABLE SIGHTING DEVICE FOR TRACTORS

BACKGROUND OF THE INVENTION

1. Field of the Invention

The invention relates to sighting devices for use on a tractor to enable a tractor driver to visually align the direction of movement of the tractor with previously cut swaths or furrows in a field, and particularly to sighting devices which are remotely adjustable by the driver while he is seated in the driver's seat of the tractor.

2. Description of the Prior Art

A variety of sighting devices have been utilized for attachment to tractors or farm implements towed by tractors to enable drivers seated in the driver's seats of the tractors to visually align the tractors with previously cut swaths or furrows dug into the ground by the towed farming implements. The sighting devices must be adjusted so that the tractors are oriented to pull the farming implements so that the farming implements cut swaths or furrows which are adjacent to and perfectly aligned with previously cut swaths or furrows when the sighting devices are in line with points in straight lines between the eyes of the drivers and edges of previously cut swaths or furrows. The state of the art for sighting devices, especially those for use in conjunction with tractors and farm implements, is believed to be accurately represented by U.S. Pat. Nos. 3,028,678; 2,827,704; 2,538,112; 2,559,761; 2,548,226; 3,932,028; and 4,034,480. None of the sighting devices disclosed in the above patents is adjustable by a person seated in the driver's seat of a tractor. Consequently, the sighting devices must be adjusted in a trial-and-error manner wherein the tractor driver dismounts from the driver's seat, adjusts the sighting device to an initial setting, remounts the tractor, and drives the tractor for a distance to see if the swath or furrow being cut by the towed farm implement is accurately aligned with the previously cut swath or furrow. Since it is very important that the swath or furrow cut by the towed implement be properly aligned with previously cut swaths or furrows, the above mentioned trial-and-error adjustment method may necessitate an unduly large number of trial settings before satisfactory adjustment of any of the prior sighting devices is achieved.

Accordingly, it is an object of the invention to provide a sighting device for use in conjunction with tractors towing agricultural implements, which sighting device avoids the necessity of the driver dismounting from the driver's seat in order to adjust the sighting device.

It is another object of the invention to provide a sighting device which avoids the necessity of a second person adjusting the sighting device in accordance with instructions from a driver seated in the driver's seat of the tractor.

Some of the previous sighting devices are attached to the farm implement being towed, rather than to the tractor. This approach to providing sighting devices requires a separate sighting device for each farm implement. Since the sighting devices are quite expensive, this approach is undesirable.

Accordingly, another object of the invention is to provide an adjustable sighting device which avoids the necessity of trial-and-error sighting methods which require dismounting of the tractor driver or assistance of a second person, which sighting devices are attached to a tractor rather than to a farm implement.

Another object of the invention is to provide a sighting device for attachment to a tractor, which sighting device is conveniently and continuously adjustable by a person seated in the driver's seat of the tractor.

Another object of the invention is to provide a low-cost sighting device which is adjustable from the driver's seat of the tractor.

Another object of the invention is to provide a sighting device for use in conjunction with tractors towing farm implements, which sighting device overcomes the shortcomings of the sighting devices of the prior art.

SUMMARY OF THE INVENTION

Briefly described, and in accordance with one embodiment thereof, the invention provides a remotely adjustable sighting device for attachment to an engine hood of a tractor to enable a driver seated in the driver's seat of the tractor to visually align the direction of travel of the tractor so that a towed farm implement cuts a swath or furrow in proper alignment with previously cut swaths or furrows. In the described embodiment of the invention, the sighting device includes two opposed telescoping extension arms for extending outwardly through variable distances from a point of the tractor on which the sighting apparatus is attached to the hood of the tractor. Each telescoping extension arm includes a fixed outer tube and an inner tube slideably disposed within the outer tube. A nut block is attached to one end of the inner tube. A drive screw extends through the nut block, and is turned by means of a drive mechanism remotely controlled by the driver as he is seated in the seat of the tractor. Pivot arms, each serving as a sighting blade, are pivotally attached to the outer ends of the respective inner tubes. Each pivot arm is controlled by means of an assembly including a drive screw connected by means of a clevis to a lower end of a pivot arm, a nut block through which the drive screw extends, the nut block being attached in fixed relationship to the inner tube on which the pivot arm is attached, and a flexible drive cable driven by the drive mechanism. The drive mechanism includes a DC motor, a pair of electromagnetic clutches coupled, respectively, by means of pulleys and drive belts to first and second rotating shafts. The first rotating shaft is connected to the drive screws passing through the nut block attached to the inner tubes, the second rotating shaft being attached to the flexible cables. A tractor battery is controllably coupled to cause the DC motor to operate in either the forward or reverse direction in response to each of a first momentary switch and a second momentary switch actuated by the seated driver. The battery is also controllably coupled to one or the other of the electromagnetic clutches in response to the actuation of the first and second momentary switches, respectively. A first and second electromagnetic breaking devices are coupled to first and second ones of the electromagnetic clutches, respectively, for preventing undesired rotation of the first and second shafts, and are energized in response to the first and second momentary switches, respectively, to disengage the electromagnetic breaking devices when the first and second electromagnetic clutches are respectively engaged. In use, the driver deploys the momentary switches, while seated in the driver's seat, to extend the extension arms and to pivot the pivot arms so that the driver sees the pivot arms aligned along and parallel to the previously cut furrows. In one embodiment of the invention, two bevel gear assemblies coupled by means of two flexible cables to first and second hand cranks located immediately adjacent to the driver's seat are utilized to rotate the first and second shafts. The driver thus turns the first and second cranks to adjust the extension arms and the pivot arms, respectively, while he is seated in the driver's seat.

BRIEF DESCRIPTION OF THE DRAWINGS

FIG. 1 is a top view of a tractor towing an implement, the sighting device of the invention being mounted on the hood of the tractor and adjusted to enable the tractor driver to align the tractor with a previously cut swath or furrow.

FIG. 2 is an enlarged view of detail 2 of FIG. 1.

FIG. 3 is a partial schematic diagram of a drive system utilized in conjunction with the sighting device shown in FIG. 1.

FIG. 4 is an enlarged view of a control panel shown in FIG. 2.

FIG. 5 is a partial sectional side view of the sighting device shown in FIG. 1.

FIG. 6 is a partial side view useful in describing the operation of the pivot arm of the sighting device shown in FIG. 5.

FIG. 7 is a section view taken along section line 7—7 of FIG. 5.

FIG. 8 is a partial section view taken along section line 8—8 of FIG. 5.

FIG. 9 is a partial sectional top view of the sighting device of FIG. 5.

FIG. 10 is a partial side view useful in explaining the operation of the sighting device of FIG. 5.

FIG. 11 is another partial side view useful in illustrating the operation of the sighting device of FIG. 1.

FIG. 12 is a perspective view of part of an alternate manual drive system replacing the motor and pulley system shown in FIGS. 3, 4, 5, and 9.

DESCRIPTION OF THE INVENTION

Referring now to FIG. 1, sighting apparatus 1, which includes two opposed horizontal extension arms 1A and 1B, each extending outwardly from a center housing 49, are mounted on hood 3A of tractor 3. Tractor 3 pulls a framing implement 5 in a forward direction. Farming implement 5 cuts a swath or group of furrows 7A as it is pulled forward through the field.

The purpose of sighting device 1 is to enable the driver of tractor 3 to keep tractor 3 oriented so that its direction of travel is parallel to the edge of previously plowed furrows 7, so that farming implement 5 cuts furrows 7A precisely parallel to furrows 7.

In order to accomplish this, the tractor driver 3 adjusts the outward extension of horizontal extension arm 1B until the entire outer edge 19A of pivot arm 17A (see FIG. 5, subsequently described) is aligned with the tractor driver's eye along the edge of furrows 7.

The structure and operation of sighting device 1 can be best understood by referring to FIGS. 5 and 9. Referring first to FIG. 5 (which is a partial sectional side view of sighting device 1 taken from the tractor driver's side of the device when it is mounted on the hood 3A of tractor 3), extension arms 1A and 1B extend horizontally outward from the sides of housing 49. As subsequently explained, housing 49 contains an electric motor, several clutches, pulleys, and belts and is attached rigidly to hood 3A of tractor 3.

In FIGS. 5 and 9, each of the reference numerals designating parts of left extension arm 1A includes the letter "A", while reference numerals including a "B" are used to designate corresponding parts of right extension arm 1B.

As indicated by FIG. 7, taken along section lines 7—7 of FIG. 5, a pair of telescopic square tubes 37A and 39A are included in extension arm 1A. Outer tube 37A is rigidly attached to the left vertical side of housing 49. Inner tube 39A extends into the open end of outer tube 37A through a closely fitting guide cap 45A. Guide cap 45A maintains square tube 39A in proper parallel relationship to outer tube 37A, and also prevents dirt and dust from entering into tube 37A.

A nut block 43A is attached to the right end of inner tube 39A and slides along the inner surfaces of outer tube 37A. Driver screw 41A extends through nut block 43A, and is attached to axel 51, which is mounted within housing 49 by means of a pair of bearings 56A and 56B. But block 43A moves to the right or left as screw shaft 41A turns clockwise or counterclockwise, causing inner arm 39A to be extended or retracted.

Right extension arm 1B, which includes outer tube 37B, inner tube 39B, nut block 43B and drive screw 41B is entirely similar in structure and operation to left arm 1A, and therefore will not be described herein in detail.

A pivot arm 17A, which is vertical in one plane, is pivotally attached by means of pivot pin 23A to the left end of inner tube 39A. Pivot arm 17A is utilized as a sighting blade, outer edge 19A of which is aligned along previously cut swath 7 as seen by the seated driver along sighting line 9 (FIG. 1). Typically, pivot arm 17A will be adjusted to an angle which is roughly 45 degrees with respect to extension arm 1A. The angle depends, of course, on the height of the driver's eye above the ground, the width of the farm implement being towed, the location of the mounting of sighting apparatus on the hood of the tractor, and the amount of extension of extension arm 1A.

The lower end 18A of pivot arm 17A is pivotally connected by means of pivot pin 25A to clevis 27A. Clevis 27A is connected to drive screw 29A. Drive screw 29A is connected by means of coupler 65A to a flexible drive cable 47A.

Drive screw 29A passes through nut block 31A, which is pivotally connected to bracket 32A. Bracket 32A is rigidly attached to inner tube 39A.

As can be easily seen by referring to FIG. 6, as flexible cable 49A turns drive screw 29A in the direction indicated by arrow 35A, drive screw 29A moves in the direction indicated by arrow 33A along stationary nut block 31A. This causes clevis 27A to move to the left, causing pivot arm 17A to pivot in the direction indicated by arrow 21A. As indicated by dotted line 17A' in FIG. 6, the position of pivot arm 17A can be varied to suit the needs of the user.

A more detailed top view of the above described pivot arm assembly is shown in FIG. 8, which is taken along section lines 8—8 of FIG. 5. Referring now to FIG. 8, pivot arm 17 includes vertical portion 18A' and a horizontal section 18A" which is perpendicular to section 18A'. The lower end section 20A' is perpendicular to section 18A", and extends into clevis 27A. Pivot pin 25A extends into a hole in section 20A and holes in clevis 27A, allowing pivot arm 17A to pivot about pivot pin 25A.

Drive screw 29A is attached by means of a coupler including end section 61A, bearing rod 64, and end section 62. End section 61A is rigidly attached to the left end of drive screw 29A. Bearing rod 64 turns rotatably in a hole in the end of clevis 27A, and is rigidly attached to end section 62. Thus, as drive screw 29A moves right and left, clevis 27A is forced to move right or left but is not caused to rotate with drive screw 29A.

Nut block 31A, through which drive screw 29A extends, its threads being mated to threads in nut block 31A, is pivotally mounted by means of pivot pin 59A to rigid bracket 32A.

Flexible cable 49A is attached by means of coupler 65 to the right end of drive screw 29A, so that cable 47A translates its rotary motion to drive screw 29A.

A pivot arm 17B, not shown, is mounted on the extreme right end of right extension arm 1B, and is controlled in an entirely similar manner.

Referring now to FIG. 9, which is a sectional top view of the structure shown in FIG. 5, a reversible DC motor 67 is rigidly mounted in housing 49. DC motor 67 has a drive shaft which extends through both ends of DC motor 67. The left end of the drive shaft of motor 67 is coupled to one plate of an electromagnetic clutch 69, the other plate of which is attached to a rotatable shaft 71. Similarly, the right end of the drive shaft of DC motor 67 is rigidly attached to one plate of a second electromagnetic clutch 77, the other plate of which is attached to rotatable shaft 80.

Pulley 73 is rigidly attached to rotatable shaft 71. A larger pulley 63 is rigidly attached to rotatable shaft 51, which, as previously explained, is rigidly attached to the inner ends of drive screws 41A and 41B, to effect extension and retraction of inner tubes 39A and 39B of extension arms 1A and 1B, respectively.

Thus, it is seen that when electromagnetic clutch 69 and DC motor 67 are both energized, belt 55 translates rotational motion from electromagnetic clutch 69 and shaft 71 to shaft 51 and drive screws 41A and 41B.

An electromagnetic brake device 75 is also attached to rotatable shaft 71. Electromagnetic brake device 75 is engaged to produce braking action on shaft 71 when electromagnetic shaft 75 is not energized, thereby preventing undesirable rotation of rotatable shaft 71. Whenever electromagnetic clutch 69 is energized, electromagnetic brake device 75 is also energized, whereby electromagnetic brake 75 becomes disengaged at the same time that electromagnetic clutch 69 becomes engaged. Electromagnetic brake device 83, which can be identical to electromagnetic brake device 75, is attached to rotatable shaft 80.

Referring now to FIGS. 2 and 4, it is seen that a control panel 11 is mounted on dashboard 3B of tractor 3, which control panel is located very close to the steering column 3C on which the steering wheel is mounted. Control panel 11 is located sufficiently close to the tractor driver that he can activate two momentary switches 13 and 15 without altering his driving position, thereby enabling him to move extension arm 1B (or 1A) and pivot arm 17A (or 17B) to adjust sighting device 1 so that outer edge 19A of pivot arm 17A appears parallel to and aligned along the edge of previously cut swath 7 to the eye of the seated driver as he views pivot arm 17A along line of sight 9. Thus, tractor 3 pulls farming implement 5 so that furrows 7A are in perfect alignment with an in proper spaced relation to furrows 7.

As indicated in FIG. 4, momentary switch 13 is normally in a centered or neutral position. Momentary switch 13 can be pushed or deflected upward, causing extension arms 1A and 1B to be extended outwardly. As soon as the operator releases momentary switch 13, it returns to its center or neutral position. When the operator deflects momentary switch 13 downward, it causes DC motor 67 to turn in the opposite direction, causing threaded screws 41A and 41B to retract extension arms 1A and 1B.

Referring again to FIG. 9, it is seen that pulley 79 engages rotatable shaft 80. Pulley 79 is coupled by means of drive belt 81 to pulley 82. Pulley 82 is mounted on rotatable shaft 83, which is supported in housing 49 by means of bearings 85A and 85B. Flexible shafts 47A and 47B (which, as previously explained, are coupled to the pivot arm assemblies 17A and 17B) are connected by means of collars 56A and 56B to the opposite ends of rotatable shaft 89. When electromagnetic clutch 77 is energized, rotation of the drive shaft of DC motor 67 is translated to rotatable shaft 80 and flexible cables 47A and 47B, causing pivot arms 17A and 17B to be pivoted.

Thus, it is seen that lateral extension of extension arms 1A and 1B and the position of pivot arms 17A and 17B can be independently controlled, depending upon which of electromagnetic clutches 69 and 77 are engaged.

Referring back to FIG. 4, momentary switch 15 is deployed by the tractor driver to pivot pivot arm 17A in the precisely the same manner that momentary switch 13 is deployed to extend or retract extension arms 1A and 1B, as previously explained.

FIGS. 10 and 11 disclose how flexible cable 47A bends to accommodate extension and retraction of inner arm 39A and pivoting of pivoting arm 17A. A bracket 89 is rigidly attached to a clamp bracket 87 some of which is in turn attached by means of lower screw 88 to other tube 37A. A lower clamp assembly 91 is removably attached to the sides of hood 3A of tractor 3.

Referring now to FIG. 3, a schematic diagram is shown illustrating the electrical coupling between reversible DC motor 67, clutches 69 and 77, and electromagnetic brakes 75 and 83' to momentary switches 13 and 15 to FIGS. 3 and 4.

Referring now to FIG. 3, motor 67 has a positive terminal 103 and a negative terminal 104, designated by M+ and M−, respectively. Electromagnetic clutches 69 and 77 have energization terminals 103 and 105, designated, respectively by CLI and CL2. Electromagnetic brakes 75 and 83' have brake pads 75A and 83A which are normally engaged. When a positive voltage is applied to energization terminals 101 and 106, designated BRL and BR2, respectively, brake pads 75A and 83A are disengaged from brake drums which are attached to rotatable shafts 71 and 80.

Motor 67 rotates in one direction when a positive DC voltage is applied between the M+ and M− terminals. The direction of rotation is reversed if the polarity applied voltage is reversed.

Electromagnetic clutches 69 and 77 have plates which are engaged when a positive voltage is applied to energization terminals CL1 and CL2.

Momentary switch 13 can be implemented by means of a switch assembly 13', which includes three ganged single pole double throw switches. The first switch includes terminal 126, which is connected to the M+ motor terminal and to wiper 30. Wiper 30 is spring biased to rest in a neutral position between terminals 121 and 122, which are connected, respectively, to negative battery terminal B− and positive battery terminal B+, also designated by reference numerals 115 and 114, respectively.

The second switch includes terminal 127, which is connected to wiper 131 and M− motor terminal 104. Wiper 131 is also spring biased in a neutral position between terminals 123 and 123′, which are connected, respectively, to B+ terminal 114 and B− terminal 113.

The third switch has a terminal 128 connected to wiper 132 and to B+ battery terminal 114. Wiper 132 is normally biased between terminals 124 and 125, both of which are connected to both CL1 clutch terminal 102 and BR1 brake terminal 101.

If momentary switch 13 is deflected upward, wipers 130, 131, and 132 electrically contact terminals 121, 123, and 124, respectively. This causes the CL1 and BR1 terminals to be energized, disengaging electromagnetic brake 75 and engaging clutch 69. Electromagnetic clutch 79 remains disengaged, and electromagnetic brake 83′ remains engaged. The M+ and M− motor terminals are connected to the negative and positive battery terminals, respectively, causing the drive shaft of motor 67 to rotate in one direction.

If the momentary switch is lowered instead of raised, the CL1 terminal 102 and BR1 terminal 101 are nevertheless energized, disengaging brake 75 and engaging clutch 69, as before. However, the connection of the motor terminals M+ and M− motor terminals to the positive and negative battery terminals is now reversed, causing the direction of rotation of the drive shaft of motor 67 to be reversed.

If momentary switch 15 is deflected upward or downward, electromagnetic clutch 77 is energized, causing it to be engaged, and brake 83′ is then energized, cuasing it to be disengaged. Motor 67 is energized and caused to rotate either clockwise or counterclockwise in the manner previously described.

A wide variety of reversible DC motors are commercially readily available. imilarly, electromagnetic clutches and electromagnetic brake assemblies are readily available and can be selected readily by those skilled in the art. A detailed description of these components of the invention is therefore not set forth herein.

In an alternate embodiment of the invention, DC motor 67, the associated electromagnetic clutches, electromagnetic brakes, pulleys, belts, the switching circuitry of FIG. 3, and the control panel of FIG. 4 are eliminated and replaced by a simple manual drive system including a pair of flexible cables connected by means of first and second bevel gear assemblies to rotating shafts 51 and 83, respectively. The first and second flexible cables are connected to first and second cranks or control knobs or handles, which are located near the seat of the tractor so that the driver can easily turn the cranks while seated in the tractor to extend or retract extension arms 1A and 1B and to adjust the inclination of pivot arms 17A and 17B.

Referring now to FIGS. 5, 9 and 12, crank 150 is mounted in mounting plate 151 (attached to the tractor near the driver's seat) by means of bearing 152, which is seated in mounting plate 151. Crank 150 is connected to flexible cable 146. Flexible cable 146 is extended along the hood of the tractor and is coupled by means of coupler 145 to rotating shaft 144. Shaft 144 is supported by bearing assembly 143 and is connected to bevel gear 142. Bevel gear 142 matches with bevel gear 141, which is attached to rotating shaft 51. Thus, when crank 150 is turned in the directions indicated by arrow 171, extension arms 1A and 1B are extended or retracted.

Similarly, crank 149 is mounted by means of bearing 153 and is connected flexible cable 148. Flexible cable 148 is connected by means of coupler 147 to shaft 140. Shaft 140 is supported by means of bearing assembly 139 and is connected to bevel gear 138. Bevel gear 138 meshes with bevel gear 137. Bevel gear 137 is attached to rotating shaft 83. Thus, when crank 149 is turned in the directions indicated by arrow 172, pivot arms 17A and 17B are adjusted.

While the invention has been described with reference to several embodiments thereof, those skilled in the art will be able to make various obvious modifications thereto without departing from the true spirit and scope of the present invention, as set forth in the appended claims.

I claim:

1. A sighting apparatus attachable to a tractor to enable the driver of the tractor to precisely align the tractor with swaths or furrows previously cut in a field by a towed farming implement, said sighting apparatus comprising in combination:
    a. a first extension arm for extending outwardly a variable distance from a first point of the tractor on which said sighting apparatus is attached to the tractor, said first extension arm having first and second ends;
    b. mounting means attached to the first end of said extension arm for attaching said extension arm to said first point of the tractor;
    c. first sighting means connected to the second end of said first extension arm for effecting visual checking of alignment of the tractor with an edge of said previously cut swath or furrow to determine whether said first sighting means lies along a straight line between an eye of the driver and the edge of the previously cut swath or furrow, said first sighting means including a sighting blade pivotably connected to the second end of said first extension arm, said sighting blade having a blade edge for simultaneous alignment with both the eye of the driver and two substantially spaced points on the edge of said previously cut swath or furrow;
    d. first control means coupled to said first extension arm for controlling a variable distance through which said first extension arm extends from said first point, a portion of said first control means being located sufficiently close to a driver's seat of the tractor to enable the driver to operate said first control means while the driver is in a normal driving position; and
    e. second control means coupled to said first sighting means for effecting pivoting of said sighting blade to precisely align two spaced points on said blade edge with the eye of the driver and respective ones of both of said substantially spaced points on the edge of said previously cut swath or furrow.

2. The sighting apparatus of claim 1 wherein said first extension arm includes a first tube rigidly connected to said mounting means, a second tube telescopically disposed within an open end of said first tube, first nut block means rigidly attached to said second tube, and first drive screw means mating with said first nut block means and connected to said first control means for extending and retracting said second tube from said first tube.

3. The sighting apparatus of claim 2 wherein said first control means includes a DC motor having a drive shaft, first electromagnetic clutch means connected to said drive shaft, first electromagnetic brake means coupled to said first electromagnetic clutch means, and first coupling means coupling said first electromagnetic clutch means to said first drive screw means, said sighting appratus being disposed in a closed housing, said housing being included as part of said mounting means.

4. The sighting apparatus of claim 3 further including sealing means connected to the open end of said first tube, said sealing means having a closely fitting aperture through which said second tube slideably extends for preventing entry of dirt and dust into said first tube.

5. The sighting apparatus of claim 2 wherein said control means includes first momentary switch control means for controllably coupling a DC battery voltage produced by a battery of the tractor to said DC motor, said first electromagnetic clutch means, and said first brake means to cause said DC motor to rotate in a direction causing extension and retraction of said second tube, engaging and disengaging of said first electromagnetic clutch means, and engaging and disengaging of said first electromagnetic brake means, said control means further including a plurality of wire conductors connected between said first momentary switching means and electric terminals of said DC motor, said first electromagnetic clutch means, and said first electromagnetic brake means.

6. The sighting apparatus of claim 5 wherein first and second tubes are metal tubes each having a square cross section.

7. The sighting apparatus of claim 6 including coupling means for coupling one end of said sighting blade to said second control means to cause adjustable pivoting of said sighting blade in response to said first control means, and wherein said coupling means includes second drive screw means, second nut block means mating with said second drive screws means and attached in fixed relationship to said second tube, and a flexible cable coupled between a first end of said second drive screw means and said motive means, and means for coupling said second drive screw means to the second end of said first pivot arm means.

8. The sighting apparatus of claim 7 wherein said first control means includes second electromagnetic clutch means connected to the drive shaft of said DC motor means, second electromagnetic brake means coupled to said second electromagnetic clutch means, and means for coupling said second elecromagnetic clutch means to said flexible cable for translating rotation of said DC motor means to said flexible cable when said second electromagnetic clutch means is engaged and said second electromagnetic brake means is disengaged.

9. The sighting apparatus of claim 6 further including a second extension arm for extending outwardly a variable distance from said first point of the tractor, said second extension arm means being in opposed relationship to said first extension arm and including a third tube rigidly mounted with respect to said mounting means and a fourth tube telescopically mounted within said third tube for extension and retraction through an open end of said third tube in response to said motive means.

10. The sighting apparatus of claim 8 wherein said first control means further includes second momentary switch means for coupling said DC voltage to said DC motor, said second electromagnetic clutch means, and said electromagnetic brake means to cause rotation of said DC motor means to adjustably pivot said first pivot arm means, engage or disengage said second electromagnetic clutch means, and engage or disengage said second electromagnetic brake means.

11. The sighting apparatus of claim 5 wherein said sighting blade lies in a plane vertical to the ground supporting the tractor, said first extension arm also lying in said plane, said blade edge of said sighting blade having a straight outer edge, said sighting blade being pivotable in response to said first control means to effect alignment of said blade edge with the previously cut swath or furrow as viewed by the driver seated in the driver's seat of the tractor.

12. The sighting apparatus of claim 1 wherein said control means includes a handle conveniently turnable by the driver of the tractor when seated in the driver's seat of the tractor, said handle being connected to said first coupling means to translate rotary motion of said handle to said coupling means.

* * * * *